Figure 1:
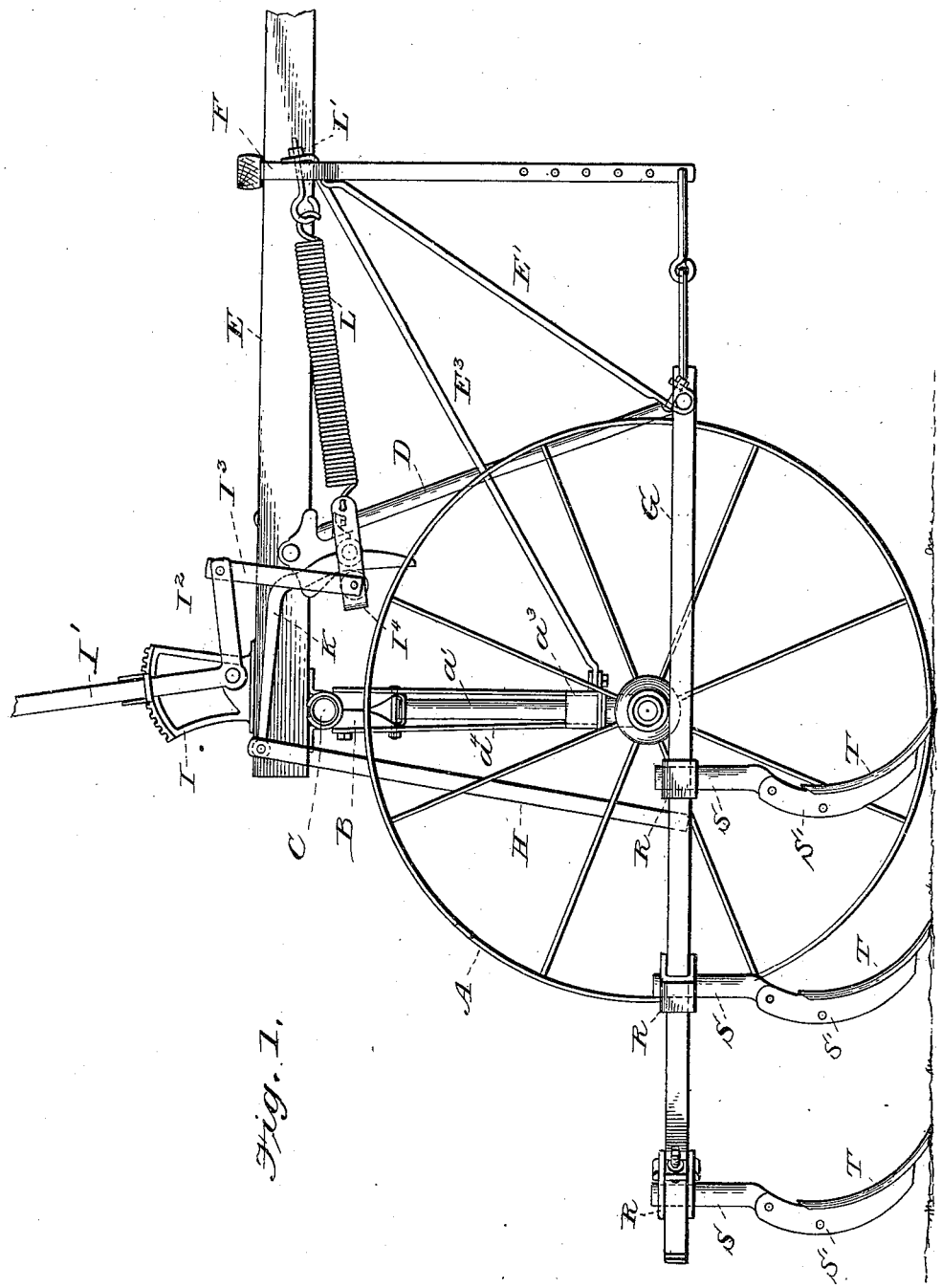

No. 651,093. Patented June 5, 1900.
S. L. ALLEN.
AGRICULTURAL IMPLEMENT.
(Application filed Mar. 30, 1898.)
(No Model.) 7 Sheets—Sheet 1.

Witnesses.
J. G. Cross
J. Henderson

Inventor
Samuel L. Allen,
by ........ Petit
Attorney

No. 651,093. Patented June 5, 1900.
S. L. ALLEN.
AGRICULTURAL IMPLEMENT.
(Application filed Mar. 30, 1898.)
(No Model.) 7 Sheets—Sheet 3.
Fig. 3.
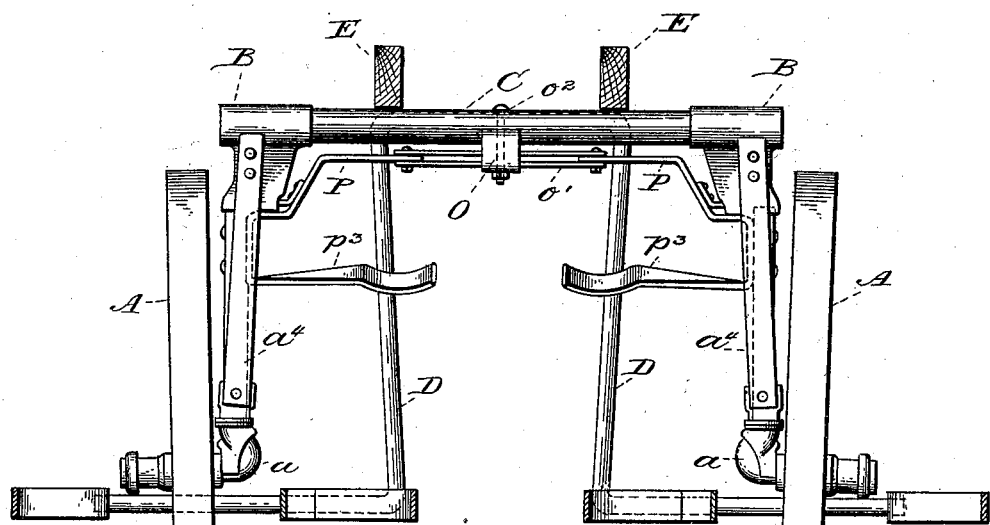
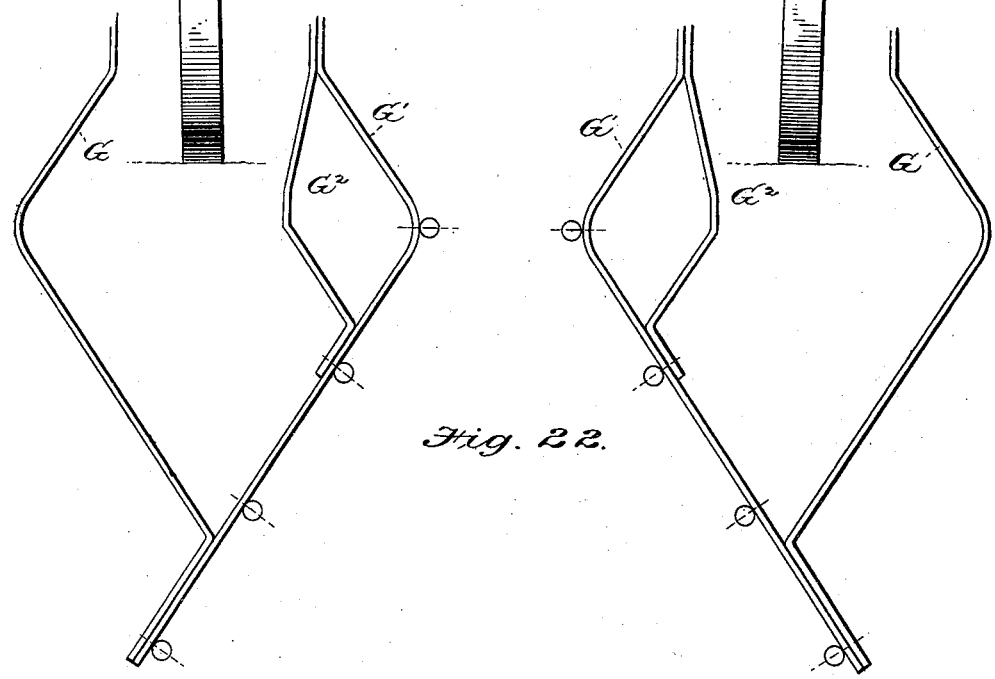
Fig. 22.
Witnesses
Inventor
Samuel L. Allen
by Hmee Pettit,
Attorney.

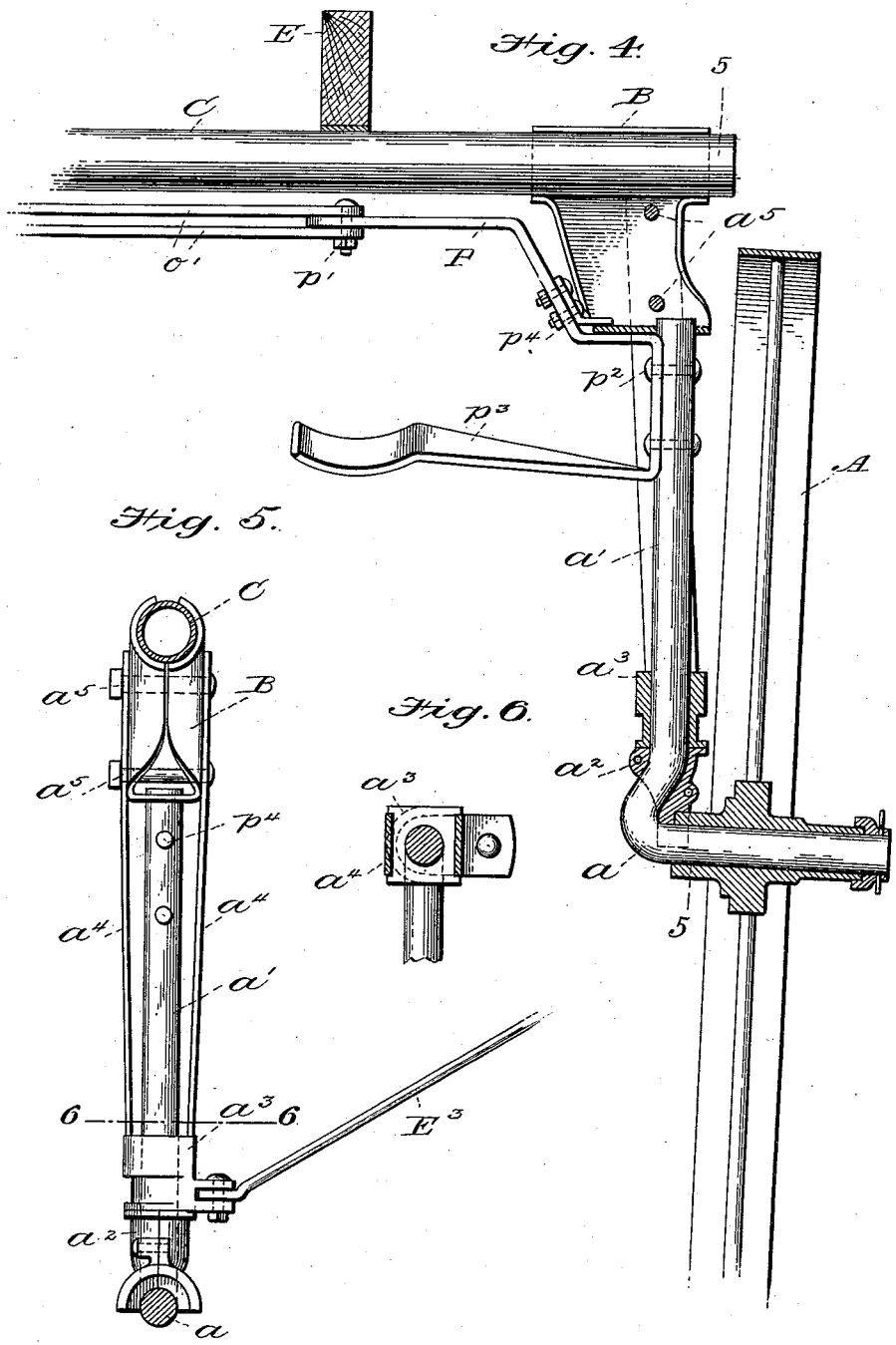

No. 651,093. Patented June 5, 1900.
S. L. ALLEN.
AGRICULTURAL IMPLEMENT.
(Application filed Mar. 30, 1898.)
(No Model.) 7 Sheets—Sheet 5.
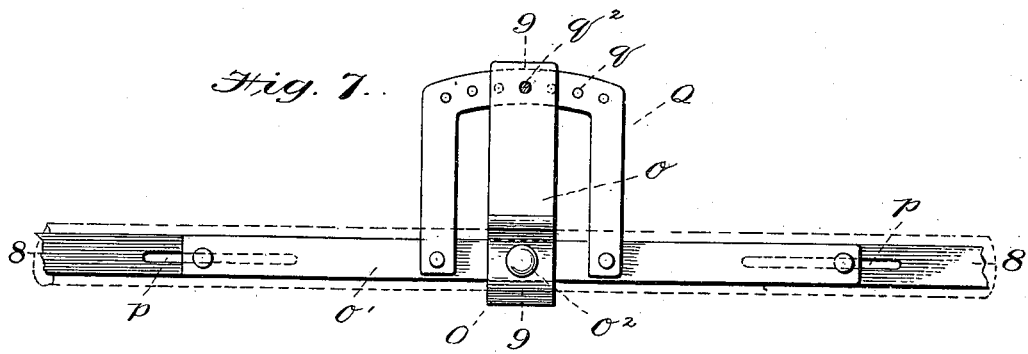
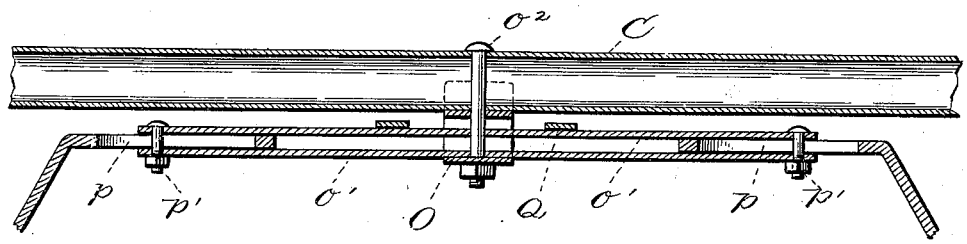
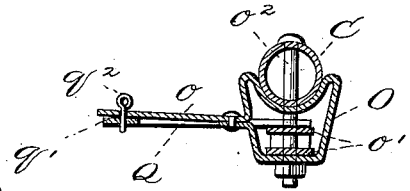
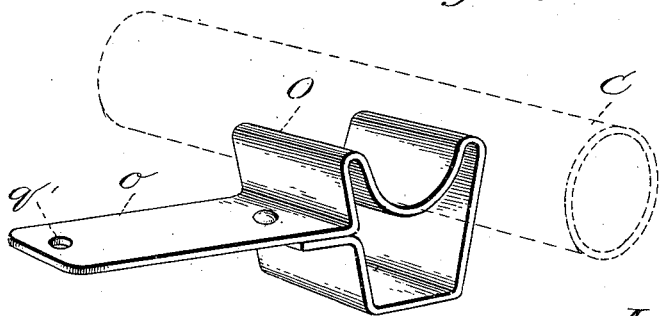
Witnesses.
Inventor,
Samuel L. Allen,
by Attorney.

No. 651,093. Patented June 5, 1900.
S. L. ALLEN.
AGRICULTURAL IMPLEMENT.
(Application filed Mar. 30, 1898.)
(No Model.) 7 Sheets—Sheet 6.
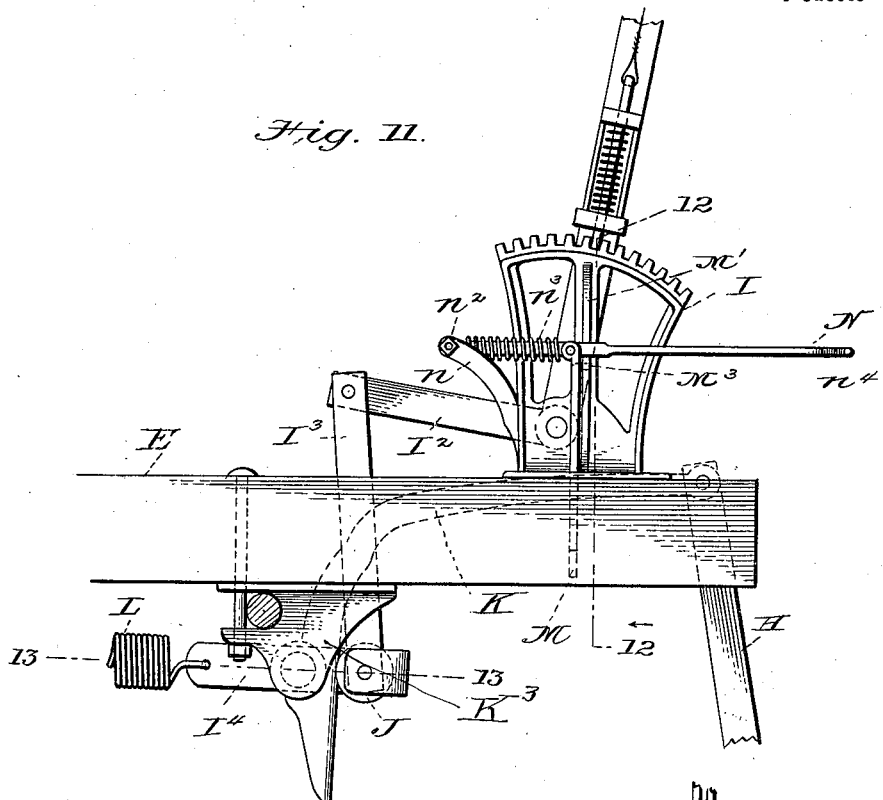
Fig. 11.
Fig. 13.
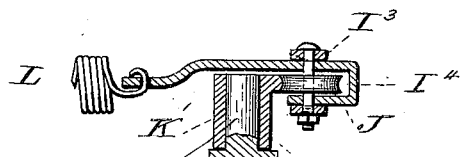
Fig. 12.
Fig. 14.
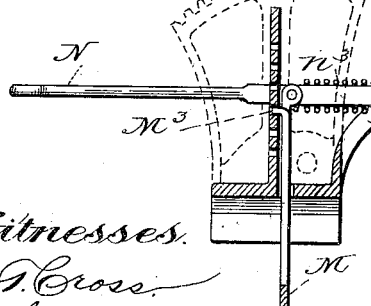
Fig. 15.
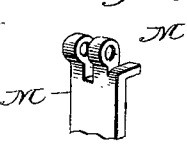
Witnesses.
J. T. Cross
J. Henderson
Inventor.
Samuel L. Allen,
by Hme Pettit,
Attorney.
THE NORRIS PETERS CO., PHOTO-LITHO., WASHINGTON, D. C.

No. 651,093. Patented June 5, 1900.
S. L. ALLEN.
AGRICULTURAL IMPLEMENT.
(Application filed Mar. 30, 1898.)
(No Model.) 7 Sheets—Sheet 7.
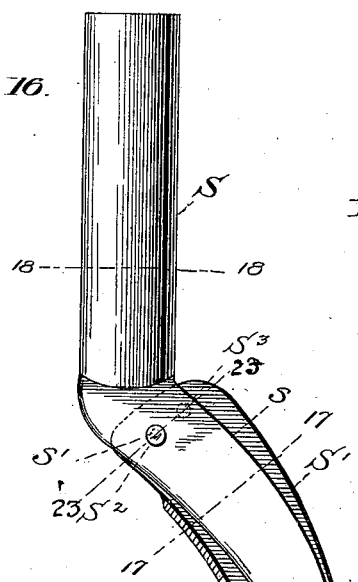
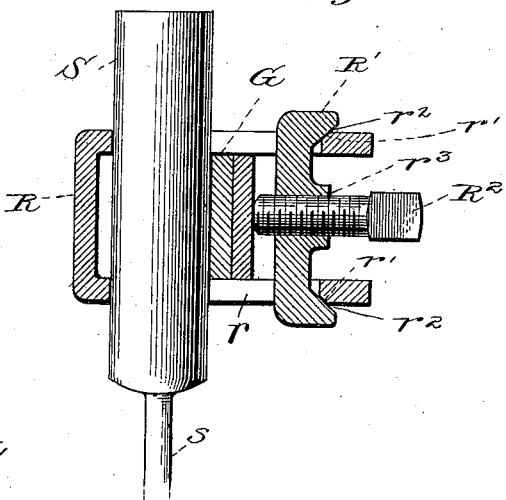
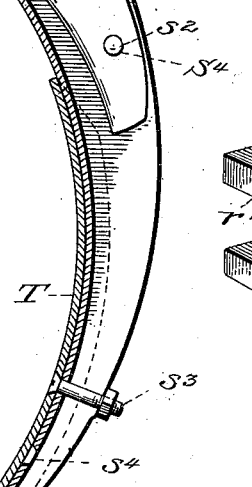
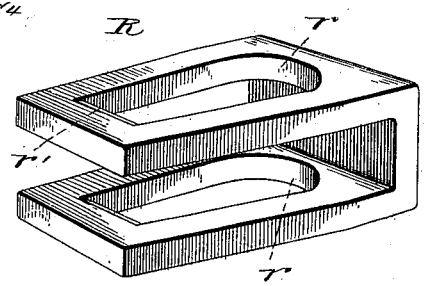
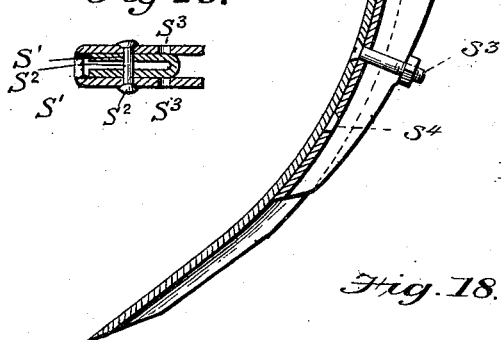
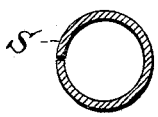
Witnesses
J. G. Cross
J. Henderson
Inventor,
Samuel L. Allen,
Attorney.

UNITED STATES PATENT OFFICE.

SAMUEL L. ALLEN, OF MOORESTOWN, NEW JERSEY.

AGRICULTURAL IMPLEMENT.

SPECIFICATION forming part of Letters Patent No. 651,093, dated June 5, 1900.

Application filed March 30, 1898. Serial No. 675,678. (No model.)

*To all whom it may concern:*

Be it known that I, SAMUEL L. ALLEN, a citizen of the United States, and a resident of Moorestown, county of Burlington, State of New Jersey, have invented certain new and useful Improvements in Agricultural Implements, of which the following is a full, clear, and exact description, reference being had to the accompanying drawings, forming part of this specification.

This invention relates to certain improvements in agricultural implements, and more particularly to double-row riding-cultivators.

The main object of my invention is to generally improve, strengthen, and simplify the construction of machines of this character and also to produce a machine which can be arranged and adjusted for a great variety of work in various kinds of crops.

Another object of my invention is to provide for the adjustment of the cultivator-teeth and their supporting-frames both laterally and as regards the depth of penetration of the soil and to provide for the adjustment of the downward pressure exerted upon the teeth.

A further object of my invention is to provide means for limiting the downward movement of the teeth and their carrying-frame, and thereby preventing too great a depth of penetration when a soft soil is reached.

A still further object of my invention is to provide for the lateral adjustment of the supporting-wheels and the teeth-carrying frames, so that the machine can be adapted for work on rows of different widths.

A still further object of my invention is to provide an improved construction of pivot-wheel and improved means for turning said wheels to guide the machine; also, to provide means for retaining the wheels at an angle to the draft of the machine when working on hillsides, so as to take up the lateral slipping, which is always occasioned on inclined surfaces.

A still further object of my invention is to provide a teeth-carrying frame surrounding the supporting-wheels, so that teeth can be located outside of said wheels, and thereby greatly diminish the width of the wheel-supporting frame, which tends to cheapen and generally improve the value and appearance of machines of this character.

A still further object of my invention is to provide an improved clamping means for securing the teeth to the carrying-frames which is capable of both vertical and lateral adjustment; also, to provide an improved construction of shank for the teeth.

With these main objects in view my invention consists in the construction, combination, and arrangement of parts, such as will be hereinafter particularly set forth and particularly pointed out in the claims made hereto.

Figure 2:
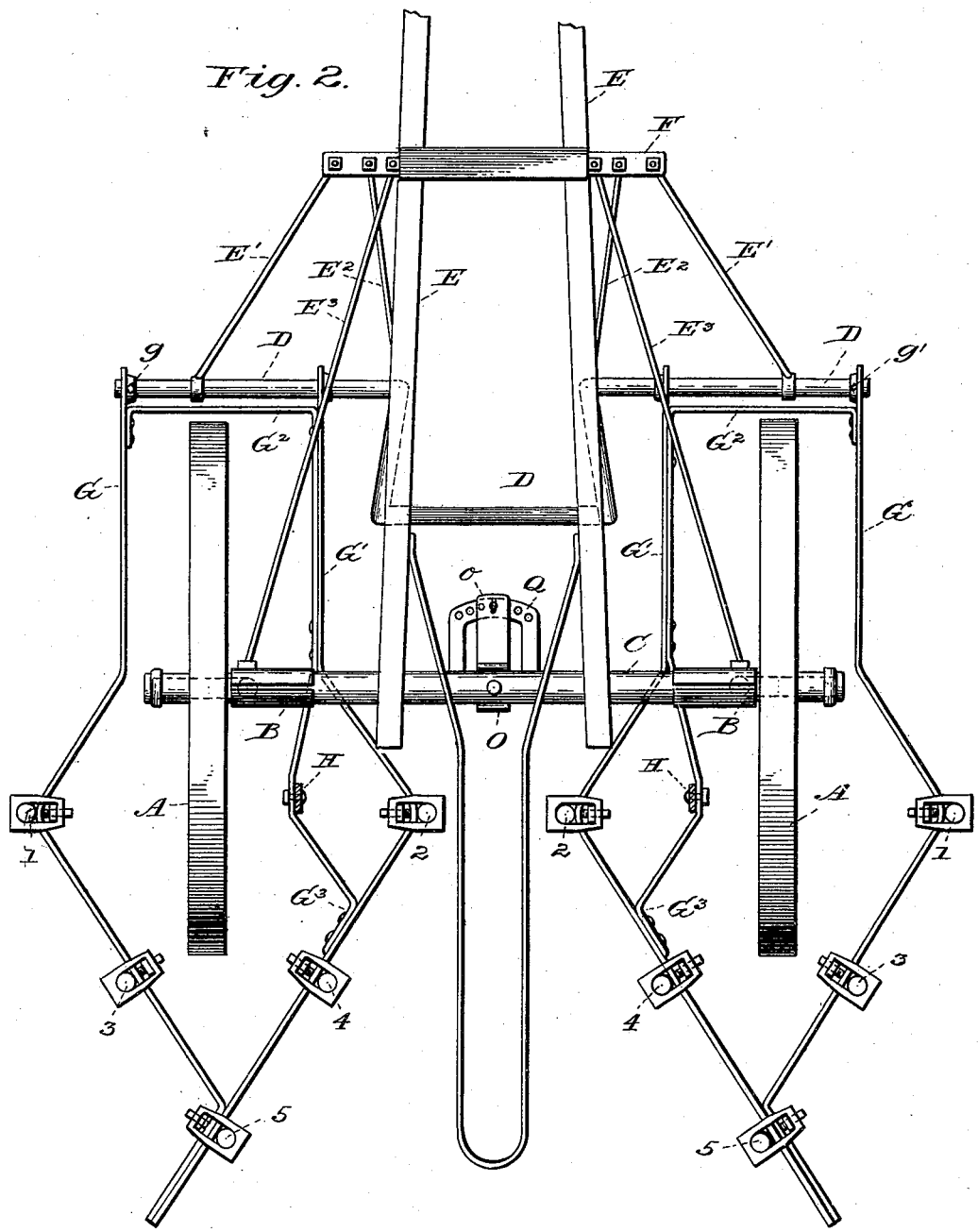

Referring to the drawings, in which similar letters and numerals of reference are used to indicate like parts, Figure 1 is a side elevation of a machine constructed in accordance with my invention. Fig. 2 is a plan view of the same, the segmental rack and lifting mechanism being omitted. Fig. 3 is an end elevation of the same, the teeth-carrying frame being shown in section. Fig. 4 is an enlarged detail sectional view through one of the pivot-wheels, showing its adjustable connection with the main supporting-frame. Fig. 5 is a sectional view taken on the line 5 5 of Fig. 4. Fig. 6 is a transverse section taken on the line 6 6 of Fig. 5. Fig. 7 is a plan view of the guiding mechanism, showing the means for holding the pivot-wheel at an angle to the draft of the machine. Fig. 8 is a longitudinal section taken on the line 8 8 of Fig. 7. Fig. 9 is a transverse sectional view taken on the line 9 9 of Fig. 7. Fig. 10 is an enlarged detail perspective view of the head and tongue shown in Figs. 7 and 8. Fig. 11 is a side elevation of the mechanism for regulating the depth of penetration of the teeth and for raising and lowering the teeth-carrying frames. Fig. 12 is a vertical sectional view taken on the line 12 12 of Fig. 11 looking in the direction of the arrow. Fig. 13 is a detail section taken on the line 13 13 of Fig. 11. Fig. 14 is a detail section taken on the line 14 14 of Fig. 12 looking toward the left. Fig. 15 is a detail perspective of the upper end of regulating-lever M, showing its tooth for engagement with rack I. Fig. 16 is an enlarged elevation of one of the cultivator-teeth, the lower part being shown in section.

Fig. 17 is a transverse section taken on the line 17 17, Fig. 16. Fig. 18 is a transverse section taken on the line 18 18 of Fig. 16. Fig. 19 is an enlarged detail section showing my improved clamp for securing the teeth-shanks to their carrying-frame. Fig. 20 is an enlarged perspective of the clamp-frame. Fig. 21 is an enlarged detail perspective of the follower-block of the clamp. Fig. 22 is a diagrammatic view.

In the drawings, A designates the supporting-wheels, which are mounted on axles $a$, said axles being bent at right angles into vertical pivot-bars $a'$, which have a bearing at their upper ends in a clamp B, which is secured to the main supporting-frame C.

E designates the tongue-bars, which are secured by means of straps and bolts to the frame C. In the forward part of the machine is a transverse frame-rod D, which is provided with a yoke-shaped central portion which extends upwardly and slightly rearwardly and is secured to the under sides of the tongue-bars E.

$E'$ designates brace-bars which connect the frame D with the cross-bar F, secured at the front of the machine to the tongue-bars E. Brace-rods $E^2$ also connect the frame D at the beginning of its upwardly-extending yoke portion with the cross-bar F, and brace-rods $E^3$ connect the blocks at the lower ends of the pivot-bars with the said front cross-bar F, said braces being all for the purpose of strengthening and giving sufficient rigidity to the frame of the machine.

Secured on the frame-rod D are the bars G $G'$, which form the substantially diamond-shape teeth-carrying frame. These bars are provided with hubs around the apertures in their forward ends and are adapted to slide on the frame-rods D and be rigidly secured thereon by means of set-screws $g$, so that the said teeth-carrying frames can be adjusted laterally to admit of working rows of different widths. A supplemental bar $G^2$ is bolted to the bar G at its forward end and extends across to the bar $G'$ and extends parallel therewith until it reaches the beginning of its diamond-shaped portion, where it extends outwardly and over to the point $G^3$ of the bar $G'$, and is secured thereto by means of bolts or rivets. This is for the purpose of strengthening and bracing the tooth-carrying frame and affording a connecting-point for the lifting-lever H. To the upper end of the lifting-lever H is pivoted an auxiliary lever K, having its forward end bent downwardly, as shown in Fig. 1 and in dotted lines in Fig. 11 of the drawings. The downwardly-projecting end of the lever K is provided on its inner side with a hub $K'$, (see Fig. 13,) into which fits a trunnion $K^2$, formed on a bracket $K^3$, which is secured to the under side of one of the tongue-pieces E. (Shown most clearly in Fig. 11 of the drawings.)

Located on the top of each of the tongue-pieces G is a segmental rack I, having pivoted thereto a hand-lever $I'$, which carries a spring-pawl adapted to engage with the teeth of the said rack and be operated by means of the usual wire connections with the handle. The lower part of the lever $I'$ is in the form of a bell-crank lever $I^2$ and is connected, by means of a link $I^3$, with a lever $I^4$. This lever $I^4$ is bent over at its rear end to form a bearing for a roller J, said roller being adapted to travel on a track $J'$, formed on the rear face of the auxiliary lever K, the rear end of which is pivotally connected to the lifting-lever H, as heretofore described. To the forward end of the lever $I^4$ is secured a coiled spring L, the other end of which is secured to an eyebolt $L'$, bolted to the front cross-bar of the machine-frame. The tension of this spring L can be adjusted by regulating the nut on the end of the eyebolt $L'$.

On the segment I is formed a rib $M'$, provided with a series of notches $M^2$, adapted to be engaged by a tooth $M^3$, formed on the lever M, a rod N, provided at its front end with a longitudinal slot $n$, through which it is pivoted to an arm $n'$, which is formed integral with the segment I. The lever M is pivoted to the rod N just in front of the rib $M'$, and interposed between this point and the pivot $n^2$ of the rod N is a coiled spring $n^3$. The rear end of the rod N is formed into a handle portion $n^4$.

The operation of this part of my machine may be described as follows: When the roller J is above the pivoted point of the lever K, the spring L reduces more or less, according to its position, the pressure of the teeth on the ground, and when the lever $I'$ is drawn all the way back it lifts the teeth several inches clear of the surface of the ground. When the roller J is on a line with the pivotal point of the lever K, the spring L has no function whatever and the carrying-frame will be free to rest on the ground by its own weight. When the roller J is below the pivotal point of the lever K, the tension of the spring L exerts pressure downwardly on the lifting-lever H and the teeth-carrying frames.

By the above-described construction the pressure required to be exerted on the teeth to accommodate different classes of soil is easily under the control of the operator, and in order to limit the depth of penetration of the teeth I have provided the rod N, which extends under the lever K and may be adjusted by means of its tooth and the rack to regulate the downward movement of the lifting-lever H and teeth-carrying frames.

The clamp B, which carries the upper end of the pivot-bar $a'$, is made of a single piece of metal stamped into the proper shape and is adjustable laterally on the frame C to change the width of the machine when it is desired to operate on different widths of rows. The lower end of the pivot-bar is bent in the shape illustrated in the drawings, so as to give it strength and to bring it in closer to the wheel. A box $a^2$, made in two sections, is adapted to fit around the beginning of this curved portion and has an annular dust-cap in its lower part, adapted to receive the inner flange of the hub of the wheel. On top of this casing $a^2$ and surrounding the pivot-bar $a'$ is a block $a^3$, and secured in recesses provided in the sides of this block $a^3$ are the connecting-bars $a^4$, which are secured at their upper ends to the clamp B, the securing-bolts passing entirely through the clamp and having adjusting-nuts on their ends. This makes the pivot-wheel and the clamp B integral, so that by adjusting the said clamp laterally upon the frame C the distance between the wheels can be regulated.

In the center of the frame C, I arrange a bearing-block O, which is concaved at its upper face and fits snugly around the said frame C and has formed on its forward side a tongue $o$. Passing through the said block O and extending transversely across the machine parallel with the frame C are the twin connecting-bars $o'$. A king-bolt $o^2$ passes through the frame C, head O, and twin bars $o'$, said bolt being provided on its lower end with a retaining-nut. Fitting between the twin bars $o'$ are the foot-levers P, provided in their horizontal portions with longitudinal slots $p$, through which the bolts $p'$ pass, which secures them to the twin bars $o'$. The lever P is bent in the form substantially as shown in Fig. 4 of the drawings and is secured at $p^2$ to the pivot-bar $a'$, the inwardly-extending portion $p^3$ of the lever P forming a foot-rest and by which the pivot-wheel may be turned at the will of the operator. A bracket $p^4$ is bolted to the arm P at a point opposite the bottom of the clamp B, which extends over said bottom for bracing and securing these parts together. Secured to the top of the upper lever $o'$ is a U-shaped frame Q, provided with a series of apertures $q$, adapted to register with an aperture $q'$, provided in the tongue $o$ for the reception of a pin $q^2$. The operation of this part of my machine will be readily understood, and it will be seen that the machine can be quickly and easily guided by means of the operator turning the pivot-wheel by the foot-levers, and if it should be desired to maintain the wheels at an angle to the draft of the machine, as is frequently the case in working on hillsides, the wheels can be held in such position by means of the tongue $o$ and the frame Q and their registering holes and pin. The longitudinal slots $p$, provided in the levers P, are for the purpose of admitting the lateral adjustment of the said levers and the pivot-wheels when it is desired to change the width of the machine.

The bearing-block $a^3$ of the pivot-bar $a'$ is provided on its bottom with a smooth bearing-face which rests on the top of a similar bearing-face provided on the two-part boxing $a^2$. This boxing $a^2$ bears the weight of the supporting-frame of the machine, and its smooth upper surface allows it to easily turn on the block $a^3$. The block $a^3$ is provided on its front side with projecting lugs $a^6$, to which are securely bolted one end of a brace-rod $E^4$, the other end of said brace-rod being secured to the front cross-bar F of the machine.

In order to securely hold the cultivator-teeth or other tool which may be employed to the carrying-frame, I have provided a clamp R, which consists of a substantially U-shaped casting having openings $r$ in its top and bottom, one end of said opening $r$ being rounded and of a diameter sufficiently large to accommodate the shank of the cultivator-tooth. The width between the top and bottom of the frame R is sufficient to admit the bars G of the tooth-carrying frame. The follower R' is provided on its upper and lower ends with extensions having inclined or wedge-shaped faces $r^2$, which are adapted to engage with the inclined edges $r'$, provided in one end of the opening R, as most clearly illustrated in Fig. 19 of the drawings. A screw-threaded opening $r^3$ is provided through the center of the follower R' for the reception of the bolt $R^2$. It will be readily seen that by adjusting the bolt $R^2$ the clamp is drawn securely against the shank of the cultivator-tooth and securely binds the same to the frame G at the same time the inclined faces $r^2$ of the follower R', coming in contact with the inclined face $r'$, draw the upper and lower parts of the clamp R together, thereby tightly binding the same on the top and bottom of the frame G, and thereby securely holding the cultivator-tooth on its carrying-frame and also securely binding the said clamp R on the carrying-frame and preventing all possibility of displacement. This clamp also admits of both lateral and vertical adjustment of the teeth, so that they may be easily moved to any position on the carrying-frame or adjusted to any height. The cylindrical shank also permits the teeth to be set at any angle desired.

The position of the teeth on the carrying-frames is clearly illustrated in Fig. 2 of the drawings, in which I have shown five teeth on each frame. The teeth 1 and 2 make a furrow close up to the row, and the teeth 3 and 4 cover up the furrows made by teeth 1 and 2, while the tooth 5 covers up the furrow made by the teeth 3 and 4, thus thoroughly cultivating the soil between two rows at one passage. By constructing the frame in the manner shown in Fig. 2 I am enabled to put the teeth on the outside of the carrying-wheels, thus enabling me to greatly diminish the distance between the said supporting-wheels, thereby strengthening the machine and saving material in construction.

If it should be desired to use this machine as a single-row cultivator, the frames G can be adjusted laterally to suit the width of the row and the outside teeth 1 and 3 on each side of the machine be dispensed with. The inside teeth 2, 4, and 5 could be readjusted on the carrying-frame and a fourth tooth 6 inserted on the end of said frame, as illustrated in Fig. 22 of the drawings. This would make eight teeth for cutting one row and ten for two rows, although a lesser number could be used.

In Fig. 16 I have illustrated an improved form of tool-holder, in which S designates the main shank, provided with an extension $s$ on its lower end. This part is formed of a continuous piece of sheet metal stamped into the desired shape. The apertures $s'$ and $s^2$ may be either drilled in the portion $s$ or else they could be stamped in the blank while it is being formed. The U-shaped plate S' is provided with openings $S^2$ $S^3$ in its upper end and opening $S^4$ in its lower end and is secured to the shank $s$ by means of a bolt passing through the lower opening $S^4$ and openings $s^2$ of said shank $s$ and a bolt passing through one of the upper openings $S^2$ $S^3$ and opening $s'$ of shank $s$. The two holes $S^2$ $S^3$ are for the purpose of allowing adjustment of the plate S' to change the angle of the tooth, which may be readily effected by simply removing the upper bolt and adjusting the plate S' until its other opening $S^3$ registers with $s'$, the lower bolt $s^2$ acting as a pivot. The tooth T is secured to the plate S' by means of the bolt $s^3$. An additional bolt-opening $s^4$ is provided slightly below $s^3$ for the purpose of readjusting the length of the tooth T after it has worn down and restoring it to the proper angle. Heretofore the shanks for the tools have been cast in a solid piece, making them heavy and expensive. By my improved manner of construction I have greatly decreased the cost of manufacture and produced a shank which is light, strong, and durable.

Having thus described my invention, what I claim, and desire to secure by Letters Patent, is—

1. In an agricultural implement, the combination of a wheel-supporting frame, tongue-bars carried by said frame, a depending U-shaped frame-bar supported by and braced to said tongue-bars and terminating in transverse arms extending in front of and beyond the wheels, tool-carrying frames adjustably mounted on each of the said transverse arms and adapted to surround the wheels of the machine, substantially as described.

2. The combination of a wheel-supporting frame, wheels adjustably mounted on said frame, tongue-bars secured to the said supporting-frame, a transverse frame-rod having a yoke in its center secured to the said tongue-bars, a pair of independent tool-carrying frames each having its rear end bent to form a substantially diamond-shaped frame adaptee to surround one of the supporting-wheels, and each of said frames having its forward end separated and adjustably secured to the transverse arms of the front frame-rod, substantially as described.

3. The combination of a wheel-supporting frame, tongue-bars carried by said frame, a transversely-arranged frame-rod having a yoke in its center whereby it is secured to the tongue-bars, tool-carrying frames adjustably secured to the lower extending arms of said frame-rod, each of said tool-frames adapted to entirely surround a supporting-wheel, bracing-bars connected to and extending transversely across the forward ends of each of said tool-frames and following rearwardly and forming loops to form connecting-points for the lifting mechanism, substantially as described.

4. A tooth-holding frame comprising flat metal bars, separated at their forward ends and adjustably attached to the frame of the machine, bent to form substantially diamond-shaped frames and having their rear ends connected and extended as shown and a bracing-bar connected to and extending transversely across the forward ends, and following rearwardly and forming a loop at the diametrical center of the diamond, the end of same being bolted to the frame as shown.

5. In an agricultural implement, a tool-carrying-frame, a lifting-lever connected at one end to said frame, an auxiliary lever pivoted at the upper end of said lifting-lever and having a downwardly-projecting forward end, said downwardly-projecting forward end being pivoted at about its center to the frame of the machine, a roller adapted to bear against the rear edge of this projection, a tension-spring connecting this roller, an operating-lever connected with the roller for moving it above and below the pivot-point of the lever, and an adjustable arresting-arm for limiting the downward movement of the auxiliary lever, substantially as described.

6. The combination with the tool-carrying frame, a lifting-lever connecting said frame, a lever, K, pivoted to the upper end of the lifting-lever having a downwardly-projecting arm pivoted at about its center to the frame of the machine, a roller journaled in an arm, $I^4$, adapted to bear against said arm, a tension-spring connecting the roller-support with the frame, an operating-lever connecting the said roller, for moving it above and below the pivoted point of the arm, K, an arresting-lever for limiting the downward movement of the lever, K, and means for adjusting the said arresting-lever to regulate the depth of the teeth, substantially as described.

7. The combination, of a tool-carrying frame, a pivoted lever connecting said frame for effecting its vertical adjustment, a tension-spring connected with said lever, a hand-lever operatively connected to the tension-spring so that either an upward or downward pressure can be exerted on the tool-carrying frame, an arresting-lever pivoted to the frame and extending under the pivoted lever, a pawl carried by said arresting-lever adapted to engage a rack on the frame and a spring-actuated rod for retaining and releasing said lever, substantially as described.

8. The combination of the transverse frame-bar, C, the clamping-heads, B, adapted to embrace the said bar, C, bolts, $a^5$ for adjustably securing the clamping-heads on the said bar, an integral axle and pivot-bar swiveled in the said head, a two-part boxing adapted to embrace the said pivot-bar and axle at the vertex of the angle, a bearing-block adapted to rest upon said boxing and free to turn thereon, and the vertical brace-bars, $a^4$, secured to the said bearing-block and to the clamping-head, B, substantially as described.

9. The combination with the transverse supporting-frame, C, clamping-heads, B, adapted to embrace the said box, and be adjustably secured thereon, of a combined axle and pivot-bar swiveled in said clamping-head, a boxing at the intersection of the angle of said pivot-bar and axle, a bearing-block loosely mounted on the pivot and resting on the boxing, bracing-bars rigidly connecting the bearing-block and the clamping-head, B, a steering-lever rigidly secured to the pivot-bar at its upper end and bearing against the bottom of the clamp, and a foot, $p^4$ engaging the opening in the end of the clamp for limiting the turn of the pivot-bars, substantially as described.

10. The combination of the frame-bar, C, carrying the clamping-heads, B, the integral axle and pivot-bar swiveled in said clamping-heads, the boxing, $a^2$, carried by the pivot-bar having a projecting flange adapted to embrace the hub of the wheel, the block, $a^3$, adapted to turn on the boxing, $a^2$, the connecting-braces, $a^4$, and the bolts, $a^5$, for adjustably securing the clamping-head on the frame, C, substantially as described.

11. The combination of the transverse frame, C, clamping-heads, B, adjustably secured thereon, the wheel-pivots swiveled in said clamping-heads, steering-levers secured to said wheel-pivots, connecting-bars adjustably secured to the upper extending arms of the steering-levers, and a king-bolt passing through the frame-bar, C, and through the connecting-bars, substantially as described.

12. The combination of the transverse frame, C, the clamping-heads adjustably secured thereon, wheel-pivots swiveled in said clamping-heads, steering-levers secured to the said wheel-pivots, connecting-bars secured to the upper extending arms of said steering-levers and pivoted in their center to the frame, C, longitudinal slots provided on the inner ends of the steering-lever arms, and bolts adapted to the said slots, and to the connecting-bars for adjustably securing the bars together, substantially as described.

13. The combination of the wheel-pivots having the steering-levers secured thereto, the connecting-frame, a block pivoted to said frame carrying a forwardly-projecting tongue, twin bars connecting the steering-levers and centrally pivoted to said block, a yoke secured to the twin bars provided with a series of apertures, and a stop-pin carried by the tongue adapted to engage the apertures in the yoke, substantially as described.

14. The combination of the wheel-pivots, the steering-levers secured thereto, having foot-pieces, $p^3$, the connecting-frame, a block, O, having a forwardly-projecting tongue, $o$, provided with an aperture in its end, bars, $o'$, connected at their opposite ends to the steering-levers, a king-bolt, $o^2$, passing through the frame-block, O, and bars, $o'$, a yoke, Q, provided with apertures, $q$, secured to the top bar, $o'$, and extending under the tongue, $o$, and a removable locking-pin adapted to pass through the aperture in the end of tongue, $o$, and through the apertures, $q$, formed in the yoke, Q, substantially as described.

15. A tool-holding clamp adapted to hold the tool to the carrying-frame, comprising a U-shaped frame having an opening in its top and bottom, a clamping-piece adapted to impinge on the top and bottom pieces of the clamp-frame, a threaded opening in said clamping-piece and a set-screw adapted to the threaded opening by means of which the tool-shank and carrying-frame are bound together and the top and bottom pieces of the clamp-frame forced together, substantially as described.

16. A tool-holding clamp comprising a U-shaped frame adapted to embrace the tool-carrying frame on its upper and lower edges, elongated openings in the top and bottom of said frame adapted to receive the tool-standard, a clamping-piece having beveled or wedge-shaped projections on its ends adapted to engage the beveled edges of the elongated openings of the U-shaped frame, and a set-screw passing through a threaded opening in the said clamping-piece, the said set-screw adapted to bear against the carrying-frame and bind the tooth-standard between it and the closed end of the clamp-frame, also to force the clamping-piece outwardly so that its beveled projection will act on the lugs of the clamp-frame and bind them firmly against the edges of the tool-carrying frame, substantially as described.

17. A tool-holding clamp comprising an open frame arranged for the reception and adjustment of the tool-shank and its carrying-frame, a set-screw, a wedge adapted to be operated thereby to clamp vertically on the tool-carrying frame, the said set-screw being adapted to force the tool-carrying frame, tool-shank, and clamping-frame into intimate contact, thereby providing both lateral and vertical clamping means.

18. A tool-holder for agricultural implements consisting of a single sheet of steel stamped to form the upper cylindrical shank portion, the lower flattened portion U-shaped in cross-section, openings formed in said U-shaped portion, a plate U-shaped in cross-section adapted to embrace the flattened end of the shank and be bolted thereto, and a tooth bolted to said plate, substantially as described.

19. In a tool-holder for agricultural implements the combination of a main shank for attachment to the frame of the machine, a plate pivoted to the lower end of said shank, a series of openings formed in the upper end of said plate, a bolt adapted to pass through the shank, and through one of said series of openings, and a tool adjustably secured on said plate, substantially as described.

In witness whereof I have hereunto set my hand this 29th day of March, A. D. 1898.

SAMUEL L. ALLEN.

Witnesses:
HORACE PETTIT,
BENJ. F. PERKINS.